United States Patent
Milway et al.

(10) Patent No.: US 7,643,413 B2
(45) Date of Patent: Jan. 5, 2010

(54) SYSTEM AND METHOD FOR PROVIDING QUALITY OF SERVICE IN ASYNCHRONOUS TRANSFER MODE CELL TRANSMISSION

(75) Inventors: David Milway, Cambs (GB); William Stoye, Cambridge (GB)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 990 days.

(21) Appl. No.: 10/746,235

(22) Filed: Dec. 29, 2003

(65) Prior Publication Data

US 2004/0184460 A1   Sep. 23, 2004

Related U.S. Application Data

(60) Provisional application No. 60/436,997, filed on Dec. 31, 2002.

(51) Int. Cl.
*H04L 1/00* (2006.01)
(52) U.S. Cl. .................. 370/230; 370/389
(58) Field of Classification Search .......... 370/391, 370/395.21, 395.41, 230, 412, 413, 395.42, 370/389, 395.4, 357; 710/30, 305, 229, 357, 710/314, 100
See application file for complete search history.

(56) References Cited

U.S. PATENT DOCUMENTS

| | | | | |
|---|---|---|---|---|
| 5,491,691 A | * | 2/1996 | Shtayer et al. | 370/395.42 |
| 5,689,508 A | * | 11/1997 | Lyles | 370/391 |
| 5,926,459 A | * | 7/1999 | Lyles et al. | 370/230 |
| 5,953,338 A | * | 9/1999 | Ma et al. | 370/395.21 |
| 6,018,527 A | * | 1/2000 | Yin et al. | 370/395.41 |
| 6,041,039 A | * | 3/2000 | Kilkki et al. | 370/230 |
| 6,064,651 A | | 5/2000 | Rogers et al. | |
| 6,104,696 A | * | 8/2000 | Kadambi et al. | 370/218 |
| 6,188,697 B1 | * | 2/2001 | Umehira et al. | 370/412 |
| 6,247,060 B1 | * | 6/2001 | Boucher et al. | 709/238 |
| 6,349,089 B1 | * | 2/2002 | Bonomi et al. | 370/230.1 |
| 6,381,242 B1 | * | 4/2002 | Maher et al. | 370/394 |
| 6,389,019 B1 | * | 5/2002 | Fan et al. | 370/395.42 |

(Continued)

FOREIGN PATENT DOCUMENTS

EP   1239637 A3   9/2002

OTHER PUBLICATIONS

Shah, Understand Network Processors, Berkley University, 93 pages, Sep. 2001.*

(Continued)

*Primary Examiner*—Frank Duong
(74) *Attorney, Agent, or Firm*—Thomas, Kayden, Horstemeyer & Risley, LLP

(57) ABSTRACT

A method and apparatus for scheduling the transmission of cells onto an network, or other packet switching network, is disclosed. The central feature of the scheduling mechanism is a quality of service engine (QoS Engine) which accelerates the processing of packets in a packet switching networks, such as an ATM network, by assisting the accurate pacing of many ATM virtual circuits. The QoS Engine allows the concurrent support of a wide variety of port speeds, traffic classes using different priorities and traffic parameters. quality of service engine (QoS Engine) works in conjunction with a network processor (NP) to allow it to maintain software flexibility, and for it to achieve accurate pacing.

26 Claims, 7 Drawing Sheets

U.S. PATENT DOCUMENTS

| | | | |
|---|---|---|---|
| 6,389,031 B1* | 5/2002 | Chao et al. | 370/412 |
| 6,426,957 B1* | 7/2002 | Hauser et al. | 370/413 |
| 6,532,213 B1* | 3/2003 | Chiussi et al. | 370/230.1 |
| 6,560,195 B1* | 5/2003 | Basak et al. | 370/230 |
| 6,563,818 B1* | 5/2003 | Sang et al. | 370/379 |
| 6,611,522 B1* | 8/2003 | Zheng et al. | 370/395.21 |
| 6,671,280 B1* | 12/2003 | Bass et al. | 370/395.53 |
| 6,675,163 B1* | 1/2004 | Bass et al. | 707/6 |
| 6,876,653 B2* | 4/2005 | Ambe et al. | 370/389 |
| 6,996,117 B2* | 2/2006 | Lee et al. | 370/429 |
| 7,042,842 B2* | 5/2006 | Paul et al. | 370/229 |
| 7,088,710 B1* | 8/2006 | Johnson et al. | 370/357 |
| 7,099,986 B2* | 8/2006 | Pettey et al. | 710/314 |
| 7,103,008 B2* | 9/2006 | Greenblat et al. | 370/258 |
| 7,165,131 B2* | 1/2007 | Creta et al. | 710/100 |
| 7,230,923 B2* | 6/2007 | Onvural et al. | 370/235 |
| 2002/0107989 A1* | 8/2002 | Johnson et al. | 709/250 |
| 2002/0118683 A1* | 8/2002 | Narayana et al. | 370/395.42 |
| 2002/0181455 A1* | 12/2002 | Norman et al. | 370/389 |
| 2003/0161318 A1* | 8/2003 | Kramer et al. | 370/395.4 |
| 2004/0081164 A1* | 4/2004 | Hassan-Ali et al. | 370/395.21 |
| 2004/0100967 A1* | 5/2004 | Robotham et al. | 370/395.4 |
| 2004/0128410 A1* | 7/2004 | Mayhew et al. | 710/30 |
| 2006/0031621 A1* | 2/2006 | Riley et al. | 710/305 |

OTHER PUBLICATIONS

Kusmierek et al., An integrated network resource and QoS management framework, IEEE, Oct. 29, 2002, pp. 68-72.

European International Search Report dated Jul. 26, 2004 for Application No. PCT/US03/41063.

* cited by examiner

AN INSERT CALCULATION CONSISTS OF THE FOLLOWING (WITH T BEING TIMER 1)

```
if (T + 2*BT < LCT) LCT = T;  // LCT wrap-around patch-up after
long time with no cells
    T2 = T;                    // schedule now
    if (T + BT > LCT)          // sufficient credit to send at
PCR
        if (rtP) P = high; else P = low;
        // enqueue to transmit at peak rate else                       // send at SCR if (rtS) P = high; else P = low;

// enqueue to transmit at sustained rate
}
```

FIG. 6

A VC WITH DATA TO TRANSMIT AND THE UPDATING THE GRCA STATE

```
    LCT += SCI;              // reduce credit
    if (T > LCT) LCT = T;    // severe congestion - limit credit to max
value
    if (T + BT > LCT)        // sufficient credit to send at PCR
    {
        T2 = T + PCI;
        if (rtP) P = high; else P = low;
        // enqueue to transmit at peak rate
    }
    else                     // send at less than PCR (typically at SCR)
    {
        T2 = LCT - BT;
        if (rtS) P = high; else P = low;
        // enqueue to transmit at sustained rate
    }
```

FIG. 7

SYSTEM AND METHOD FOR PROVIDING QUALITY OF SERVICE IN ASYNCHRONOUS TRANSFER MODE CELL TRANSMISSION

CROSS-REFERENCE TO RELATED APPLICATIONS

The present invention claims priority to co-pending U.S. Provisional Patent Application No. 60/436,997, filed Dec. 31, 2002 and entitled "System and method for providing quality of service in asynchronous transfer mode cell transmission", the entirety of which is incorporated by reference herein.

BACKGROUND OF THE INVENTION

The present invention relates generally to data communication networks and, more particularly, to transmission control mechanisms, including ATM communications processors and switches, and cell reception and header interpretation in asynchronous transfer mode systems/networks.

With the proliferation of the digital age, increasing need has arisen for a single versatile networking technology capable of efficiently transmitting multiple types of information at high speed across different network environments. In response to this need, the International Telegraph and Telephone Consultative Committee (CCITT), and its successor organization, the Telecommunications Standardization Sector of the International Telecommunication Union (ITU-T), developed Asynchronous Transfer Mode, commonly referred to as ATM, as a technology capable of the high speed transfer of voice, video, and data across public and private networks.

ATM utilizes very large-scale integration (VLSI) technology to segment data into individual packets, e.g., B-ISDN calls for packets having a fixed size of 53 bytes or octets. These packets are commonly referred to as cells. Using the B-ISDN 53-byte packet for purposes of illustration, each ATM cell includes a header portion comprising the first 5 bytes and a payload portion comprising the remaining 48 bytes. ATM cells are routed across the various networks by passing though ATM switches, which read addressing information included in the cell header and deliver the cell to the destination referenced therein. Unlike other types of networking protocols, ATM does not rely upon Time Division Multiplexing in order to establish the identification of each cell. That is, rather than identifying cells by their time position in a multiplexed data stream, ATM cells are identified solely based upon information contained within the cell header.

Further, ATM differs from systems based upon conventional network architectures such as Ethernet or Token Ring in that rather than broadcasting data packets on a shared wire for all network members to receive, ATM cells dictate the successive recipient of the cell through information contained within the cell header. That is, a specific routing path through the network, called a virtual path (VP) or virtual circuit (VC), is set up between two end nodes before any data is transmitted. Cells identified with a particular virtual circuit are delivered to only those nodes on that virtual circuit. In this manner, only the destination identified in the cell header receives the transmitted cell.

The cell header includes, among other information, addressing information that essentially describes the source of the cell or where the cell is coming from and its assigned destination. Although ATM evolved from Time Division Multiplexing (TDM) concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and traveling to a multiplicity of destinations.

The backbone of an ATM network consists of switching devices capable of handling the high-speed ATM cell streams. The switching components of these devices, commonly referred to as the switch fabric, perform the switching function required to implement a virtual circuit by receiving ATM cells from an input port, analyzing the information in the header of the incoming cells in real-time, and routing them to the appropriate destination port. Millions of cells per second need to be switched by a single device.

Importantly, this connection-oriented scheme permits an ATM network to guarantee the minimum amount of bandwidth required by each connection. Such guarantees are made when the connection is set-up. When a connection is requested, an analysis of existing connections is performed to determine if enough total bandwidth remains within the network to service the new connection at its requested capacity. If the necessary bandwidth is not available, the connection is refused.

In order to achieve efficient use of network resources, bandwidth is allocated to established connections under a statistical multiplexing scheme. Therefore, congestion conditions may occasionally occur within the ATM network resulting in cell transmission delay or even cell loss. To ensure that the burden of network congestion is placed upon those connections most able to handle it, ATM offers multiple grades of service. These grades of service support various forms of traffic requiring different levels of cell loss probability, transmission delay, and transmission delay variance, commonly known as delay jitter. It is known, for instance, that many multimedia connections, e.g., video streams, can tolerate relatively large cell losses, but are very sensitive to delay variations from one cell to the next. In contrast, traditional forms of data traffic are more tolerant of large transmission delays and delay variance, but require very low cell losses. This variation in requirements can be exploited to increase network performance.

In particular, the following grades of service are preferably supported in modern ATM networks: constant bit rate ("CBR") circuits, variable bit rate ("VBR") circuits, and unspecified bit rate ("UBR") circuits. These categories define the qualities of service available to a particular connection, and are selected when a connection is established. More specific definitions of each of these categories are set forth below.

A CBR virtual circuit is granted a permanent allocation of bandwidth along its entire path. The sender is guaranteed a precise time interval, or fixed rate, to send data, corresponding to the needed bandwidth, and the network guarantees to transmit this data with minimal delay and delay jitter. A CBR circuit is most appropriate for real-time video and audio multimedia streams which require network service equivalent to that provided by a synchronous transmission network. From the perspective of the source and destination, it must appear as if a virtual piece of wire exists between the two points. This requires that the transmission of each cell belonging to this data stream occur at precise intervals.

A VBR virtual circuit is initially specified with an average bandwidth and a peak cell rate. This type of circuit is appropriate for high priority continuous traffic which contains some burstiness, such as compressed video streams. The network may "overbook" these connections on the assumption that not all VBR circuits will be handling traffic at a peak cell rate simultaneously. However, although the transmission rate may vary, applications employing VBR service often require low delay and delay jitter. The VBR service is further divided into real-time VBR (rt-VBR) and non-real-time VBR (nrt-VBR). These two classes are distinguished by the need for an upper bound delay (Max CTD). MaxCTD is provided by rt-VBR, whereas for nrt-VBR no delay bounds are applicable.

A UBR virtual circuit, sometimes referred to as connectionless data traffic, is employed for the lowest priority data transmission; it has no specified associated bandwidth. The sender may send its data as it wishes, but the network makes no guarantee that the data will arrive at its destination within any particular time frame. This service is intended for applications with minimal service requirements, e.g., file transfers submitted in the background of a workstation.

A particular end-node on the network may have many virtual circuits of these varying classes open at any one time. The network interface at the end-node is charged with the task of scheduling the transmission of cells from each of these virtual circuits in some ordered fashion. At a minimum, this will entail pacing of cells from CBR circuits at a fixed rate to achieve virtual synchronous transmission. Additionally, some form of scheduling may be implemented within some or all of the switches which form the ATM network. Connections which have deviated from their ideal transmission profile as a result of anomalies in the network can be returned to an acceptable service grade.

The design of conventional ATM switching systems involves a compromise between which operations should be performed in hardware and which in software. Generally, but not without exception, hardware gives optimal performance, while software allows greater flexibility and control over scheduling and buffering, and makes it practical to have more sophisticated cell processing (e.g., OAM cell extraction, etc.).

Additional background information pertaining to ATM can be found in a number of sources and need not be repeated directly herein. For example, U.S. Pat. No. 6,122,279 (Milway et al.), assigned to the assignee of the present invention, provides a thorough description of ATM and is incorporated herein by reference. In addition, U.S. Pat. No. 5,953,336 (Moore et al.), also assigned to the assignee of the present invention, provides background on ATM traffic shaping, among other things, and is likewise incorporated herein by reference.

Relative to traffic shaping, the small size of ATM cells allows fine-grain interleaving of multiple data streams on a single physical connection, which means that it is possible to maintain the contracted quality of service individually for each stream. However, this is hard to achieve in practice, as the data streams will have different traffic parameters, different priorities, and the data to be transmitted may be arriving from multiple sources, and may be a mixture of ready-for-matted cells and buffers which must be segmented.

Accordingly, there is a need in the art of ATM networking for a more flexible method and system for shaping ATM traffic and ensuring adequate quality of service guarantees.

SUMMARY OF THE INVENTION

The present invention overcomes the problems noted above, and provides additional advantages, by providing a system and method for pacing asynchronous transfer mode (ATM) cell, where a shaping acceleration engine (hereinafter referred to as a QoS engine") accelerates the processing of ATM traffic. The QoS Engine 205, accelerates the processing of ATM traffic, by assisting the accurate pacing of many ATM virtual circuits (VC's) over many physical ports. It allows for the concurrent support of a wide variety of port speeds, traffic classes, and traffic parameters. It works hand in hand with the Network Processor in order to achieve such accurate pacing, so that the software flexibility of the Network Processor is maintained. The QoS Engine operates on data entries, with its values consisting of timestamp, representing an absolute time, an index field representing a newly created entry, port representing a physical port number, priority field representing a high or low priority, by constantly sorting the values of those entries so that when a particular port is ready-to-transmit, the next best entry is immediately available. In one embodiment, the present invention discloses a dual-processor hardware configuration incorporated in the traffic shaping system of the present invention. In particular, the hardware configuration includes several ATM ports for both receiving and transmitting ATM cells to neighboring network nodes. Two processors a network processor and a protocol processor share a memory. In one embodiment, the network processor handles low-level transmission and reception of ATM cells which may include, for example, segmentation and re-assembly functions, as well as the scheduling of port servicing. The network processor may also handle other network ports and have hard real-time requirements on the behavior of its software. The protocol processor conversely handles higher level protocols and performs functions, such as bridging and routing. In another embodiment of the present invention, a generic rate control algorithm GRCA (leaky bucket), that uses logical cell time (LCT) and the system clock to determine when the bucket is full, over-full and when it is empty.

Similarly, some embodiments include a computer-readable medium containing a computer-executable program for accelerating the processing of packet-based traffic in a packet switching network. Additionally, some embodiments include at least the following: one or more instructions for providing a quality of service engine for accelerating the processing of packet based traffic: one or more instructions for allocating data entry values for scheduling transmission of packets on one or more virtual circuits; and one or more instructions for sorting data entry values to determine the next best available data entry once a particular port is ready to transmit. Additionally, the one or more instructions for allocating data entry values for scheduling transmission of packets on one or more virtual circuits further comprises one or more instructions for identifying a timestamp field, an index field, a port field, and a priority field.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention can be understood more completely by reading the following Detailed Description of the Preferred Embodiments, in conjunction with the accompanying drawings, in which:

FIG. 6 is a procedure for inserting a virtual circuit into the Quality of Service engine according to one embodiment of the present invention.

FIG. 7 is a procedure for re-inserting a virtual circuit into the Quality of Service engine according to one embodiment of the present invention.

DETAILED DESCRIPTION OF THE PREFERRED EMBODIMENTS

The following description is intended to convey a thorough understanding of the invention by providing a number of specific embodiments and details involving ATM processing and systems. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
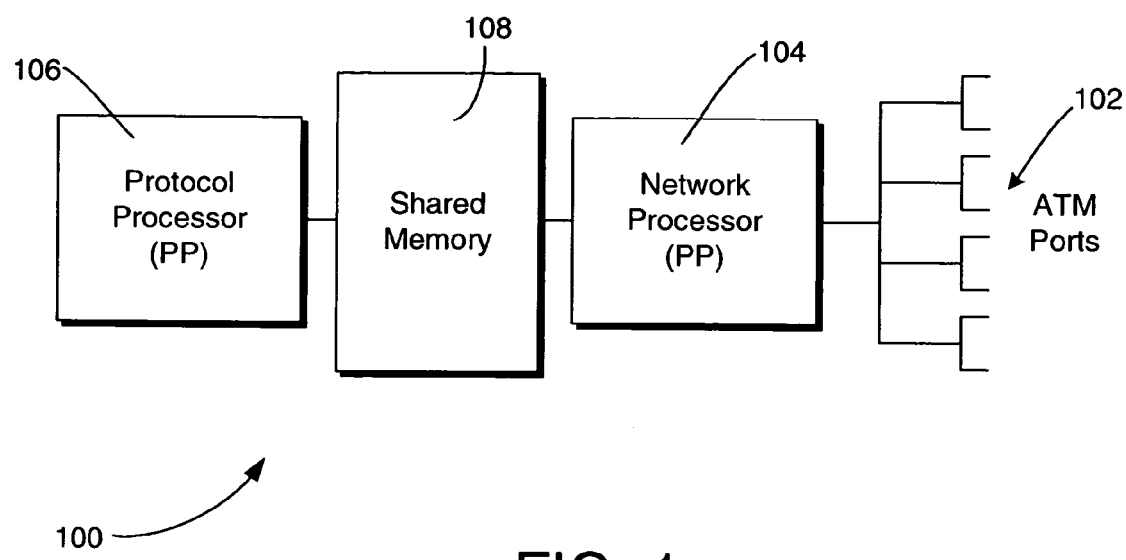
FIG. 1 is a schematic block diagram illustrating a dual processor hardware configuration according to one embodiment of the present invention.

Now referring to the Figures and, in particular, FIG. 1, there is shown a schematic block diagram illustrating one embodiment of a dual-processor hardware configuration 100 incorporated in the traffic shaping system of the present invention. In particular, the hardware configuration 100 includes several ATM ports 102 for both receiving and transmitting ATM cells to neighboring network nodes. Two processors 104 and 106 are also included as well as a memory 108 which is shared by the two processors. In one embodiment, the first processor 104 (hereinafter referred to as the "Network Processor" or "NP") handles low-level transmission and reception of ATM cells. This may include, for example, segmentation and re-assembly functions, as well as the scheduling of port servicing. The NP 104 may also handle other network ports and have hard real-time requirements on the behavior of its software. The second processor (dubbed the "Protocol Processor" or "PP") 106 conversely handles higher level protocols and performs functions, such as bridging and routing.

In the exemplary embodiment described in detail below, two general types of sources may generate ATM traffic handled by the above hardware configuration. A first type of source includes locally originated ATM traffic. Locally originated ATM traffic is defined as traffic that is locally generated as far as an ATM driver on the PP 106 is concerned. For example, this locally originated traffic may be created by a process on the PP 106 or, alternatively, the traffic may consist of packets bridged or routed from another network interface (which might not be considered "locally generated" in the system as a whole, but which is considered "locally generated" for the instant example). In general this bridged or routed traffic is held as buffers which correspond to groupings of several ATM cells (e.g., AAL5 packets) and which must be segmented into discrete cells before transmission from an output port.

The second source of ATM traffic includes switched ATM cells which arrives on the ATM ports and are switched individually to one or more ports as they arrive. Switched circuits may be unicast, with one output cell for each input cell, or multicast, wherein each input cell is replicated to several branches (which may be on different output ports). ATM traffic streams from both types of sources are carried by virtual circuits or virtual paths, which we will refer to generically as "flows". Each flow may be characterized by the following: a priority; a traffic class, such as CBR, rt-VBR, nrt-VBR, or UBR; and a corresponding set of traffic parameters specifying the rate at which cells should be transmitted and how much variation in the transmission rate is permissible. For the sake of simplicity, the following description assumes that the priority corresponds to the traffic class with CBR cells being given the highest priority and UBR cells being given the lowest priority. However, it should be understood that this convention need not be applied.

Figure 2:
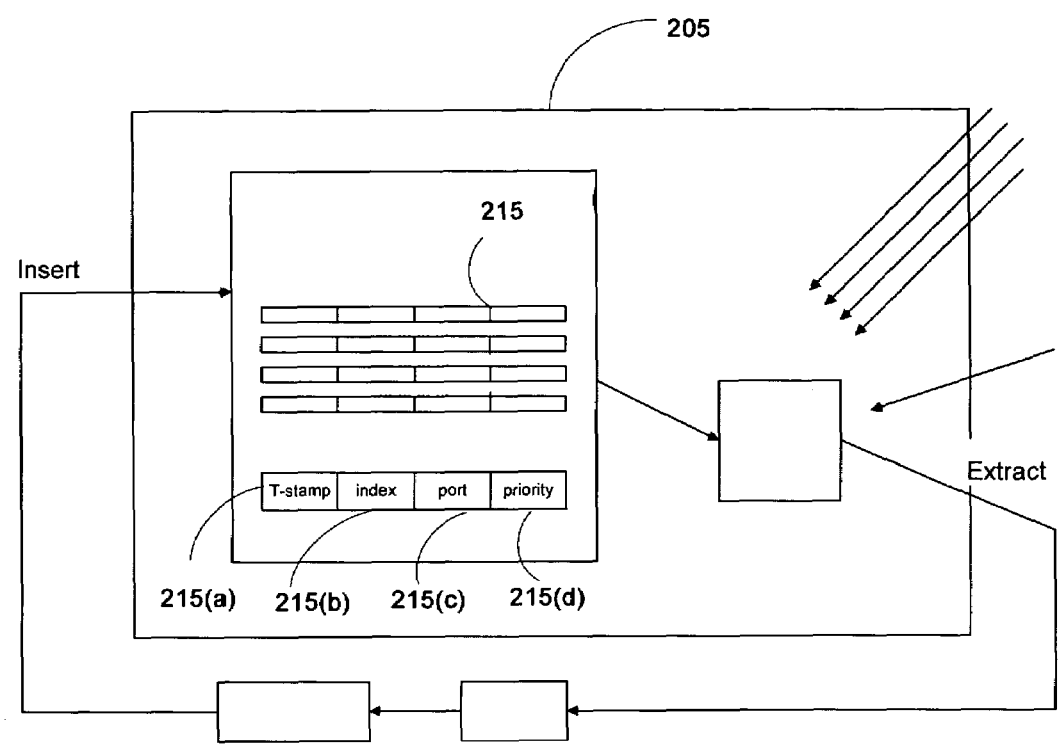
FIG. 2 is a schematic block diagram illustrating a Quality of Service engine that polices insertion and extraction of bits according to one embodiment of the present invention.

In another embodiment of the present invention, and in reference to FIG. 2, a system and method for pacing asynchronous transfer mode (ATM) cell is disclosed, where a shaping acceleration engine (hereinafter referred to as a QoS engine") accelerates the processing of ATM traffic. The QoS Engine 205 which is described here, is in terms of ATM operations, however, nothing within it is ATM-specific and it is generally applicable to any paced transmit interface. The QoS Engine 205, accelerates the processing of ATM traffic, by assisting the accurate pacing of many ATM virtual circuits (VC's) over many physical ports. It allows for the concurrent support of a wide variety of port speeds, traffic classes, and traffic parameters. It works hand in hand with the Network Processor 104 in order to achieve such accurate pacing, so that the software flexibility of the Network Processor 104 is maintained. The QoS Engine 205 operates on data entries 215, with its values shown in table 1, and consisting of timestamp 215(*a*) an absolute time, index 215(*b*) an index for newly created entry, port 215(*c*) a physical port number, priority 215(*d*), a high or low priority, by constantly sorting the values of those entries so that when a particular port is ready-to-transmit, the next best entry is immediately available. The driving software uses the 'index' field 215 (*b*) to locate a particular Virtual Circuit, transmits one cell from that circuit, and then re-inserts the entry into the QoS Engine 205 with a new updated timestamp 215(*a*) that corresponds to when the virtual circuit can next transmit a cell.

TABLE 1

Entries stored by the QoS Engine.

| | |
|---|---|
| timestamp | 20-bit value (count of microseconds) |
| index | 12-bit value |
| port | 8-bit value (physical port number) |
| priority | Boolean - high or low |

The timestamp 215(*a*) is an indication of the earliest absolute time at which an entry should be returned. All times are relevant to a system clock that is a 32-bit count of 8.sup.ths of microseconds since reset and designated as 'timer 1'. Time values may not be inserted more than half the available range ahead of the current 'timer 1' value, otherwise, there will be a possibility of creating a wraparound in the timestamp comparison. The QoS Engine block 205 does not interpret the 'index' value, rather, the index value is typically used by the driving software as an index into a Flow table. A Flow that usually corresponds to one direction of a single virtual circuit. The index 215(*b*) of the present invention is used as a secondary sort key, in order to provide stability in cases where many Flows have the same traffic contract.

In an inventive step of an index value 215(*b*) comparison, a 32-bit subtract of a concatenated timestamp and index values is calculated, and when the result is a positive number (top bit clear), then the first value is regarded as being later in time than the second that may not be a conventional signed or unsigned compare, but which gets the desired answer in the presence of wrapping in the available number space.

The primary resource of the QoS Engine is a large SRAM memory, with a 32 bit word for each stored entry. There is some additional overhead for each port. The memory may be partitioned at start of the day for the maximum number of entries per port, such a space may not be re-allocated at run-time without interrupting the pacing process. Each port may hold entries with high or low priority that are absolute, in that a high priority entry will always be selected in preference to a low priority one. In the event that more than two priorities per port are required, it must be implemented by the external software.

QoS Engine Memory Layout

The PP 106 and the NP 104 read and write to the QoS Engine 205's memory as a memory-mapped area which is used for setup and management, and therefore, high speed processing may not be paramount to the overall operation. At the start of the day, various values may be written to divide up the space among the physical ports. The first few words of the QoS Engine 205's memory are used to provide general details about each port queue. Each port queue uses four words for this purpose, so that the details of the queue for a port n are to be found at the n×4$^{th}$ word of the memory. The memory words are divided up in a fashion depicted in table 2.

TABLE 2

NP memory word address, size and purpose.

| NP address byte offset | size (bits) | purpose |
|---|---|---|
| 0 | 16 | base of queue: a word offset from the base of QoS Engine memory |
| 2 | 16 | size of queue: a number of words |
| 4 | 16 | number of high-priority elements currently in the queue |
| 6 | 16 | number of low-priority elements currently in the queue |
| 8 | 12 | index to return for a null available transmit slot |
|   | 20 | inactive-poll time: timestamp at which to return news of a null available transmit slot |
| 12 | 32 | reserved |

The PP 106 or NP 104 may correctly set up the structures for the values of each memory address of the QoS engine 205, before performing an insert or a remove operations on the QoS Engine 205. The QoS Engine 205 map address and value for the NP 104 access is shown in table 3 below.

TABLE 3

QoS Engine Memory map for NP access, relative to QOS_ENGINE_MEM:

| address | reset value | value |
|---|---|---|
| +0 | uninitialized | location 0 of QoS Engine RAM |
| +4 |  | location 1 of QoS Engine RAM |
| +n×4 |  | location n of QoS Engine RAM |

One other embodiment of the present invention is the setup for the NP 104 access to the QoS Engine 205's addresses, where the network processor (NP) 104 accesses the QoS engine 205's memory address, bit sizes of such addresses, and whether it is able to write to or read out of, as well as the instruction required to be performed after such an access by the NP 104. The complete illustration is depicted on table 4.

TABLE 4

QoS Engine Register Addresses for NP access, relative to QOS_ENGINE

| address | width (bits) | read/write | reset value | name | use |
|---|---|---|---|---|---|
| +0 |  |  | 0 | CONTROL | What bits needed? Any at all? |
| +4 | 8 | r/w | 0 | PORT | Current port, for Insert or Remove. Auto-updated by reading from Next-port. |
| +8 | 12 | r/w | 0 | INSERT_INDEX | Auto-updated by any Remove operation |
| +12 | 1 | r/w | 0 | INSERT_PRIO | Auto-updated by any Remove operation |
| +16 | 20 | w/o |  | INSERT_TIME | A write to here triggers an Insert at this absolute time, in 256$^{ths}$ of a microsecond |
| +20 | 32 | r/w | 0 | PORTMASK0 | ports 0 . . . 31 polling mask |
| +24 | 32 | r/w | 0 | PORTMASK1 | ports 32 . . . 63 polling mask |
| +28 | 32 | r/w | 0 | PORTMASK2 | ports 64 . . . 95 polling mask |
| +64 (16 words) |  | R/o | 0 | REMOVExx | Remove an entry (see table of Remove operations for details) |

For REMOVE reads, each address bit which has a high or a low value (i.e. a one or a zero) allows an operation as depicted in table 5 below.

TABLE 5

The lowest few bits of the address read and the exact remove operation:

| address bit | value | meaning |
|---|---|---|
| bit 2 | 0 | High priority if present, else low priority |
| | 1 | Force access to low priority on that port |
| bit 3 | 0 | Mask out the timestamp (high bits of reply are zero) |
| | 1 | Provide the timestamp (in bits 12..31 of reply) |
| bit 4 | 0 | Remove only if timestamp is 'ready' compared to now, returning index 0 otherwise. |
| | 1 | Remove whether ready or not |
| bit 5 | 0 | Remove |
| | 1 | Peek (return the value, do NOT remove from the port queue) |

How to Insert

Figure 3:
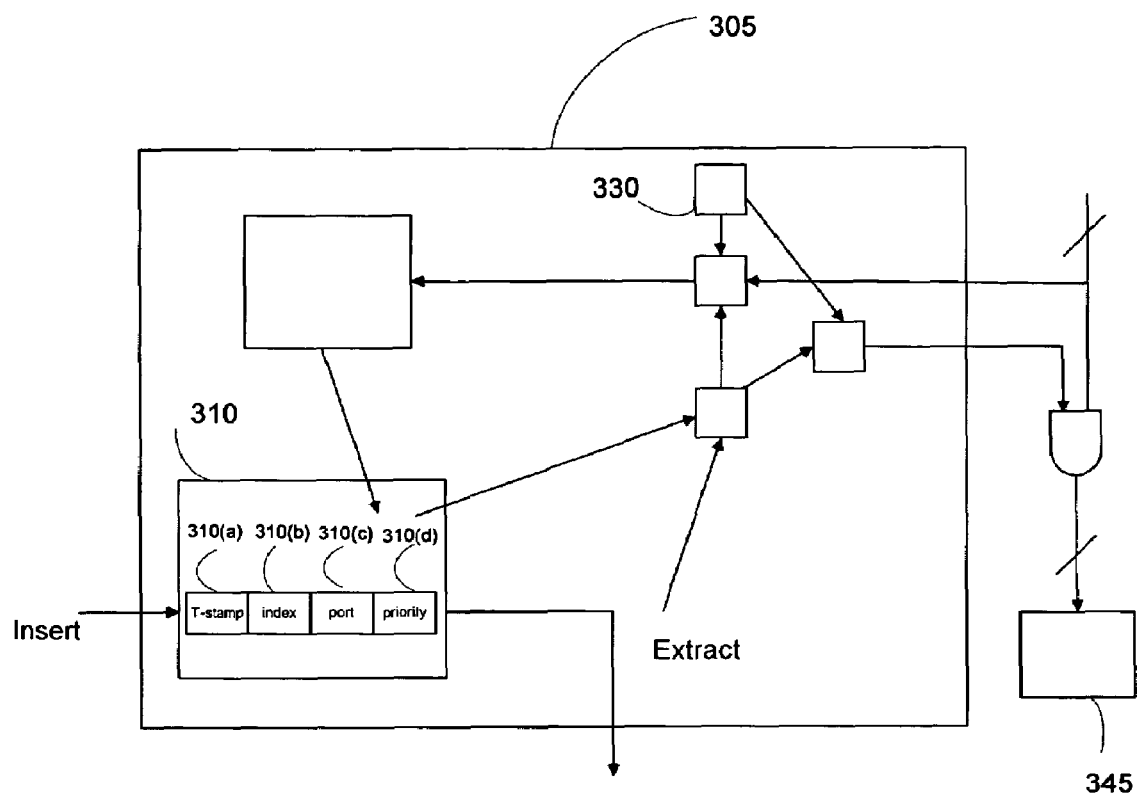
FIG. 3 is a schematic block diagram illustrating a Quality of Service engine polling and determining the next-port register according to one embodiment of the present invention.
Figure 4:
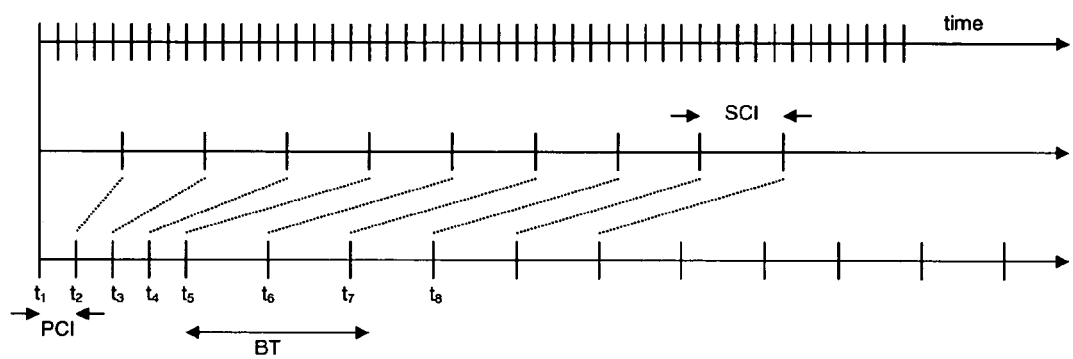
FIG. 4 is a graph showing a variable bit rate transmission and the relationship between a physical cell transmit slot, sustainable cell interval, peak cell interval and last compliant time values according to one embodiment of the present invention.

In one embodiment of the present invention, and in reference to FIG. 3, the NP 104 may perform an insert operation by doing a STM (store-multiple) instruction to the QoS Engine 305 registers, where the last address of the STM actually triggers the insert operation. The words that should be written are port (physical port number) 310 (*c*), index (index for newly created entry, where the bottom 12 bits only are retained) 310(*b*), prio (priority bottom bit only is retained) 310(*d*) and timestamp (absolute time) 310(*a*). The time value should be in $256^{ths}$ of microseconds, as a timer 1 (system clock) value shifted left by 5 bits, a value that should be greater than the current value of timer 1, and not more than half a second beyond the current value of timer 1.

How to Remove

The NP 104 removes an entry from a port queue by doing a single local destination re-routing (LDR) operation, that provides an 'index' value, which is then converted by the NP 104 into the address of a structure representing a Flow; the PORT register is set every time the NP 104 reads from the next-port logic 345, which makes processing via next-port slightly faster. The act of Removing an entry sets the INSERT_INDEX and INSERT_PRIO, in case the resulting code intends to re-insert the entry again.

Polling and the Next-Port Register

The next-port logic 345 which resides outside the QoS Engine 305, is used by the NP 104 to decide which port to process next. The QoS Engine 305 provides a mask through block 330 that provides a polling mask to this process that prevents a port from showing up if it is being already handled by the QoS Engine, but does not yet have an entry that is ready to be processed. The QoS Engine continuously checks the database 310 to see which ports are 'ripe', i.e. have an entry which needs processing, or have reached their inactive-poll time.

Using a Port Queue Unrelated to a Physical Port.

Since there is nothing that prevents the software from maintaining a port queue that is not related to a physical port. The software can simply by choosing a port n which is not paced by the QoS Engine 305, ensure that port n is not set in the polling mask, allocate the desired size of some memory in the QoS Engine 305, initialize QoS Engine 305 locations n×4 and n×4+1 to point to the allocated memory, and insert or remove entries as desired. It should be noted that it is highly desirable for the next-port 345 hardware to provide a bit which does not correspond to a physical port, but which can claim to be 'ready-to-transmit' at low priority. The software could use this, for instance, in collection with a port queue, to schedule 'background' operations such as the replicating of ATM multicast cells, such a mode of operation provided within the QoS Engine 305 requires no special hardware, an it might be desirable to provide more than one such bit. For instance, the software could use this in order to implement the pacing into an inverse multiplexing over ATM (IMA) link, or a Virtual Path (VP). These applications suggest that several such bits should be provided.

GRCA Representation

For the GRCA (Generic Rate Control Algorithm) that may be used to time cell transmissions on a virtual circuit (VC).

TABLE 6

Generic Rate Control Algorithm (GRCA) parameters, size and units.

| GRCA parameter | represented as | value size | value units |
|---|---|---|---|
| SCR, Sustainable Cell Rate | SCI, interval between sustainable cell transmission times | 32 bits | $256^{ths}$ of microseconds |
| PCR, Peak Cell Rate | PCI, interval between peak cell transmission times | 32 bits | $256^{ths}$ of microseconds |
| BT, Burst Tolerance | maximum burst length permitted at peak rate | 30 bits | $64^{ths}$ of microseconds |
| class | rtP, the real-time peak flag | 1 bit | set for CBR and rt-VBR VCs, clear for all others |
| | rtS, the real-time sustained flag | 1 bit | set for CBR and all VBR, clear for UBR |
| current credit level | LCT, logical cell time | 32 bits | $256^{ths}$ of microseconds |

In an embodiment of the present invention, a generic rate control algorithm GRCA (leaky bucket), is disclosed wherein a logical cell time (LCT) is the deficit from the GRCA, and timer 1 (which is the system clock) is a credit to the GRCA. In the event that the LCT is equal to timer 1, the bucket is full, and thus there is maximum credit, when the LCT is less than timer 1, the bucket is over-full and must be carefully pruned, and when the LCT is greater than or equal to the addition of timer 1 and the burst tolerance (BT), the bucket is empty. When transmitting at peak rate LCT will advance faster than timer 1, until it is BT ahead (=no credit left). At this point, there is only a need to transmit at a sustained rate. LCT and timer 1 will advance in step from there on.

Comparisons are done as simple unsigned integer comparisons, and wraparound works neatly in most cases, but there is a problem if the Flow stays outside the QoS Engine (because no data to transmit) for over half the time it takes for LCT to wrap (about 8 seconds). In this case, the Flow can appear to have no credit. This is a relatively minor effect. It can be defeated, if required by a background thread in the controlling software, which must visit all Flows at least every 8 seconds and patch up the LCT values. A specific instance of the GRCA 530 is used either for receive (policing) or for transmit (pacing) of cells. On transmit, cell delay variation (CDV) may not used, which corresponds to an allowance for cells that are closer together than the peak cell interval (PCI), due to variation introduced by the link or physical layer, or by an unpaced transmitter. For a receive (policing) GRCA, the act of receiving a cell at a particular time would update the state, and generate a Boolean return to indicate if the reception violated the policing operation, an operation that would typically lead to the cell being tagged (e.g. using cell loss priority, CLP bit) or dropped.

Sustained cell interval (SCI) is held to high precision for the support of high speed ports, to reduce overall long-term drift. In fact the maximum permissible value is determined by the range of timestamps held in the database (i.e. half a second). Pacing rates slower than this are not supported directly by the QoS Engine. Slower rates can be manufactured by software, by only transmitting a cell every other activation of the Flow. OC3 rates (typically 155.52 Mbps) mean that the smallest possible inter-cell gap is about 2.73 μs, so using $256^{ths}$ of microseconds means that the worst possible error on the rate in cells per second is about 1 in 700. This should be sufficient for most purposes, where the bottom two bits of BT is used as flags to give the priority when at peak or sustained rate.

Typical Virtual Circuit State Machine

Figure 5:
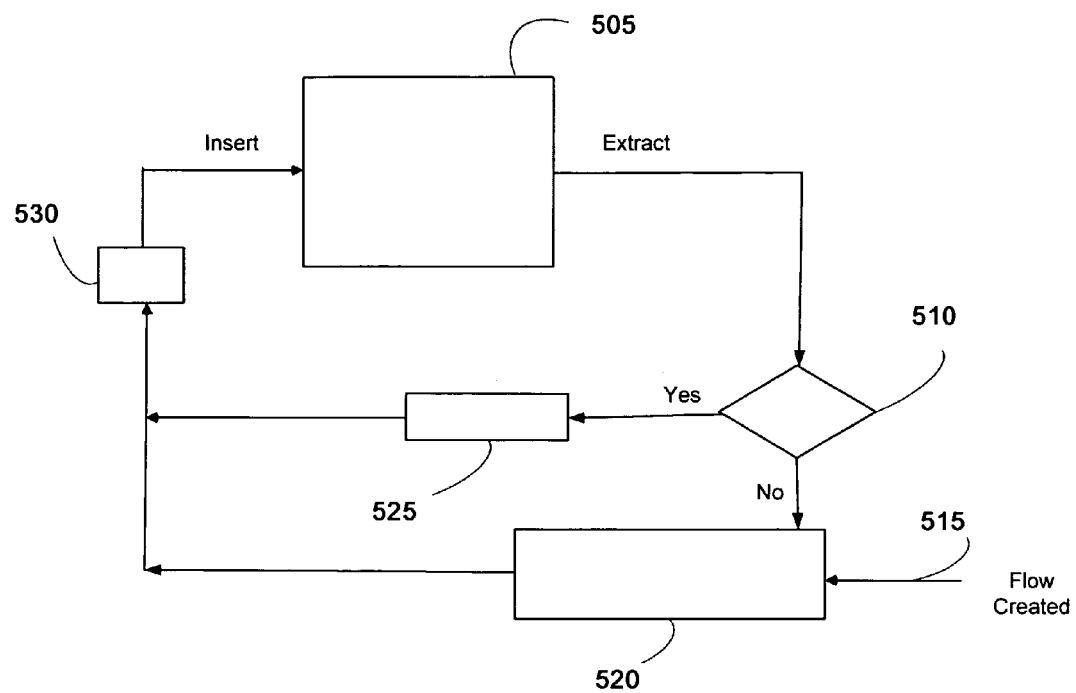
FIG. 5 is a schematic block diagram illustrating a simplified per-flow state machine according to one embodiment of the present invention.

In yet another embodiment of the present invention, and in reference to FIG. 5, a virtual circuit state machine implemented by the NP software, for the case of a Flow representing unidirectional paced traffic on a single ATM virtual circuit or VP is disclosed, where the process begins with the start of day 515 of FIG. 5, where a virtual circuit virtual circuit exists but has no cells to transmit. The virtual circuit is not inserted into the QoS Engine 505, but in the event that a virtual circuit exists that was not in the QoS Engine 505, and now has data to transmit, the virtual circuit is inserted into the QoS Engine 505, requesting time-now, which allows waiting for a physical transmit slot. With T being timer 1 (i.e. system clock), one embodiment of the present invention performs an insert calculation that consists of the system checking if the system clock, T added to twice the burst tolerance (BT) is less than the logical cell time (LCT), if the such a check is true, then the system clock T (i.e. timer 1) and the logical cell time are equal, and therefore, the state is a LCT wrap-around patch-up after long time with no cells. When T2 is equal to T, it is time to schedule a transmit now. But if the system clock T added to the burst tolerance is greater than the logical cell time, the indication is that there is not enough credit to transmit cells at peak cell rate. If a real time peak flag exists, then the indication is that the priority is high, therefore, the system is instructed to enqueue to transmit at peak rate, otherwise, the priority is low and the system transmits at sustained cell rate. And if a real time sustained flag exists, priority may either be high or low, and the system is instructed to enqueue to transmit at sustained rate. When a virtual circuit emerges from the QoS Engine 505, it is determined by block 510 whether the virtual circuit has data to transmit, and if there is no data to transmit, it is passed onto block 520, where waits until a cell is available to transmit, and the GRCA 530 state is not updated, and the virtual circuit is re-inserted into the QoS Engine 505. And finally, when a virtual circuit emerges from the QoS Engine 505 at time T, and is determined by block 510 that the virtual circuit has data to transmit, it is passed onto block 525, where a cell from that flow is transmitted, and the virtual circuit is re-inserted into the QoS Engine 505 via the GRCA 530 at time T2 with a priority P based on equating the logical cell time to be equal to the logical cell time added to the sustained cell interval, that translates to credit to be reduced; and if the time T, is greater than logical cell time, logical cell time and T are equated, meaning that severe congestion exists and therefore, the credits must be limited to maximum value; but if T and the burst tolerance combined is exceeds the logical cell time, it is an indication that there is sufficient credit and that cells may be transmitted at peak cell rate. When T2 is equal to T added to the peak cell rate interval, and if a real time peak flag exists, peak is high, and the QoS Engine 505 enqueues to transmit at peak rate, otherwise, the peak is low and QoS Engine 505 transmits at less than peak cell rate (typically at sustained cell rate). When T2 is equal to logical cell time subtracted from the burst tolerance, and if a real time sustained flag exists, and whether peak is high or low, the QoS Engine 505 enqueues to transmit at a sustained rate.

In an embodiment of the present invention, it is disclosed that on each port, the QoS Engine 505 maintains sorted Flows at two separate priorities. The mapping to ATM traffic classes is disclosed, using these basic mechanisms. At Constant Bit Rate CBR, virtual circuits are represented with the sustained cell rate interval being less than or equal to the line rate, as long as line rate is not greater than SCI and the peak cell rate interval is equal to the sustained cell rate interval, the burst control being equal to zero and that the real time peak and real time sustained flags are equal and true. Then the virtual circuit will always be enqueued at high priority (if it has cells to transmit). If a virtual circuit has no cell available then it builds up no credit. And when a virtual circuit suffers a minor delay through some other reason (due to other NP load; physical transmit rate granularity; or other CBR traffic) it will build up credit, and so overall throughput will not be affected. At real-time Variable Bit Rate VBR, rt-VBR virtual circuits are represented with the sustained cell rate interval being greater than peak cell rate interval, peak cell rate interval being greater than the line rate, burst tolerance being equal to $(n+1)×SCI−n×PCI$, for an n-cell peak burst and that the real time peak and real time sustained flags are equal and true. Then the virtual circuit will always be enqueued at high priority, and will achieve PCI and SCI. The PCIs should not be overbooked, i.e., the sum of all CBR and rt-VBR PCIs should be less than the physical line rate. So, in practice the PCI may not be much more than the SCI. If the PCIs have been overbooked but the SCIs have not been overbooked, then the SCIs of all CBR and rt-VBR traffic will eventually be met. At non-real-time variable bit rate VBR virtual circuits are represented with the sustained cell rate interval being greater than peak cell rate interval, peak cell rate interval being greater than or equal to the line rate, the burst tolerance equaling $(n+1)×SCI−n×PCI$, for an n-cell peak burst, and that the real time peak flag is false, and the real time sustained flag is true. Then the virtual circuit will be enqueued at low priority while sending at peak rate, and at high priority when sending at sustained rate. The virtual circuit is assured of achieving its SCI, but higher bandwidth than this is dependent on loading in the lower priority queue. High (overbooked) peak rates are permissible and do not interrupt CBR traffic. However, the sustained rate is assured. The SCIs should not be overbooked (when added to the SCIs of CBR and rt-VBR traffic as well). If they are, the throughput of CBR traffic could be affected. In the presence of many unspecified bit rate UBR virtual circuits, they could get placed in low-priority while at peak rate to find that the entire peak time has gone past, and are in fact not even achieving SCI. If a mix of all of these traffic classes must be supported concurrently, and the possibility of this behavior is not acceptable, then four priority levels per port should be used. At UBR+ (UBR with Peak Cell Rate), virtual circuits are represented with the sustained cell rate interval being greater than peak cell rate interval, peak cell rate interval being greater than or equal to the line rate, burst tolerance being equal to $(n+1)\times SCI - n \times PCI$, for an n-cell peak burst and that the real time peak flag is false, and the real time sustained flag is false. Then the virtual circuit will always be enqueued at low priority. Within this constraint, the system applies the PCI/SCI/BT within the available bandwidth. High, overbooked peak rates are permissible. In times of severe overload bandwidth is shared out proportional to SCI, rather than in proportion to the PCI. At unspecified bit rate UBR, virtual circuits are never held in the scheduler queues. When a physical port has a transmission slot, but no queued virtual circuits are yet allowed to transmit, the controlling software can transmit a cell from a UBR virtual circuit. At available bit rate ABR, there is no specific support for ABR, other than the ability to re-specify the SCR at each cell. In this context, ABR should be regarded as being like variable bit rate, but with an additional control plane which affects the SCI/PCI settings.

Traffic Classes Using Four Priorities

In the event that all of the above traffic classes are to be used at once, on a single port, four priorities are available to a port, using two memory areas, the idea of moving VBR (and ABR) onto two separate priorities, depending on whether it is at PCR or SCR, may be appropriate. Four priority levels per port, depending on the exact mix of traffic classes and number of virtual circuits, may be a requirement to run four priority levels on an individual port. The software may facilitate it by using two port numbers for a the queuing on a single physical port. The QoS Engine memory must be allocated in two distinct areas, corresponding to the two logical ports.

Multicast: No special consideration is required in the pacing. As far as the output functionality is concerned, each output of a multicast virtual circuit appears just like a unicast virtual circuit.

Virtual Paths (VPs): The output of a VP is just like a virtual circuit. It would be possible for the software to pace cells feeding into a virtual circuit, by dedicating a logical port number (and a corresponding area of QoS Engine memory) to that VP. The VP is also represented as a single entry on the physical port over which it runs. A state machine implemented in NP software links the various states based on combinations of:

no cells to transmit/one or more virtual circuits within the VP may transmit a cell no capacity/the VP itself may transmit a cell Only a small number of VPs can be controlled in this way, as each requires a pre-allocated area of QoS Engine memory, and a pre-allocated software-controlled ready-to-transmit bit in the next-port register.

Inverse Multiplexing for ATM (IMA): The virtual circuits that operate within an IMA link occupy a port queue, just like a Virtual Path. In addition to this, the physical ports over which the IMA link operates can use the port queue facilities, if required. The software implements the IMA state machine.

Dynamic Reallocation of QoS Engine Memory. The intention of this section is to allow port queue areas to be re-allocated, while in use. This would considerably alleviate the pain of having to pre-allocate the available space. On Flow creation, if there is not enough room, a port's port queue could be moved to a larger contiguous area as long as there is some spare space. What this means is that the entries of a 'port' are divided into more than one physical area of memory. This is merged with hardware support for four priority levels per port, which also requires multiple physical areas per port. The representation of a port's entries is changed, as follows. It maps several areas of QoS Engine Memory, to a single port.

Dynamic Reallocation of QoS Engine Memory

In another embodiment of the present invention is a method to allow port queue areas to be re-allocated, while in use. On Flow creation, if there is not enough room, a port's queue could be moved to a larger contiguous area as long as there is some spare space. What this means is that the entries of a 'port' are divided into more than one physical area of memory. This is merged with hardware support for four priority levels per port, which also requires multiple physical areas per port. The representation of a port's entries is changed, as follows. It maps several areas of QoS Engine Memory, to a single port.

Port n (which can be a physical or logical port; the port numbers are defined by the next-port logic) has a single word pointer at 32-bit location n in the QoS Engine's memory. This in turn, is a pointer to a Memory area Descriptor.

TABLE 7

The layout of a memory descriptor (MD).

| NP address byte offset | size (bits) | name | purpose |
| --- | --- | --- | --- |
| 0 | 16 | base | base of queue: a word offset from the base of QoS Engine memory |
| 2 | 16 | size | size of queue: a number of words |
| 4 | 16 | nhi | number of high-priority elements currently in the queue |
| 6 | 16 | nlo | number of low-priority elements currently in the queue |
| 8 | 12 | nulli | index to return for a null available transmit slot |
|   | 20 | nullt | inactive-poll time: timestamp at which to return news of a null available transmit slot |
| 12 | 16 | next | pointer to another MD, or 0 for 'end of chain' |
| 14 | 1 | same | if set, and next!=0, the next MD in the chain is the at the same priority as the current one, for polling purposes. Otherwise, the next one is at a lower priority than the current one. |
|   | 15 |   | unused |

If the 'next' field is non-null, then the nulli and nullt fields are ignored. Thus, you only get nulli/nullt at the end of the chain. In effect they are the lowest priority item of all.

The control software for the device must construct these chains of descriptors, in allocating memory at start of day. It is expected that this runs on the PP, not the NP. The PP also keeps track of what areas of memory area unused.

The polling hardware must traverse this chain of descriptors every time a port is polled. By default each MD in the chain provides another two priority levels. Or, if the 'same' flag is set then the two are regarded as being at the same priority as each other.

The PORT register, for Insert operations, is replaced by a register called INSERT_ADDR which is a pointer to the MD at which the insertion occurs. The Remove operation fills in the correct value to allow easy re-insertion. If the traffic classes want to support removal from one MD and insertion into another, for instance to change priorities, then the software must figure out the linkage between the two MDs using its own structures.

The intention of this structure is that four (or even six) priorities may be attached to a port, in two memory areas. A memory area can thus be realloc-ed and provide a service while both old and new areas are linked on the chain. The old one immediately precedes the new one, and has the 'same' bit set.

In order to support the 'realloc' case, there is one final wrinkle to the behavior of Remove. When Remove-ing from a MD, and the 'same' bit is set, then the INSERT_ADDR register is set to the next MD in the chain for this port. In this way entries will be removed from the old port queue, and inserted into the new one. In more detail, this should allow the realloc-ing of a port queue area, entirely under the control of the PP. Neither the NP, nor the QoS Engine, need break the service at all. Given a port n with four priorities, represented by two MDs at m1 and m2. To replace the higher priority MD, at m1:

1. Allocate a new memory area
2. Construct a new MAD, m3, which is to replace m1.
3. m3→next=m2; m1→next=m3, m1→same=true. Now there are three MADs on the chain for port n, in order m1, m3, m2. The arrangement of fields in the MAD means that the update of m1→same/true is atomic.
4. As entries mature, the memory of m1 should gradually become empty. Wait until this is so.
5. Set QoS Engine memory location n to point to m3, rather than m1. m1 is now removed from the list (atomically). Its memory can be reclaimed for future use.

The initial array of pointers, rather than the initial array of immediate MADs, is specifically to allow the atomic asynchronous replacement of the first MAD entry in the chain. The m1 replacement case also works when there is only one memory area for this port. To replace the lower priority MD, at m2:

6. Allocate a new memory area
7. Construct a new MAD, m3, which is to replace m2.
8. m2→next=0; m2→next=m3, m2→same=true. Now there are three MADs on the chain for port n, in order m1, m2, m3. The arrangement of fields in the MAD means that the update of m2→same/true is atomic. The nulli/nullt fields of m2 are ignored now because m2→next is no longer 0.
9. As entries mature, the memory of m2 should gradually become empty. Wait until this is so.
10. Set m1→next to point to m3, rather than m2. m2 is now removed from the list (atomically). Its memory can be reclaimed for future use.

Overall this makes the hardware block a great deal more flexible. It also makes four priorities per port far more acceptable.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed:

1. A method of accelerating processing of packet-based traffic in a packet switching network, comprising:
   providing a quality of service engine for accelerating processing of packet-based traffic by pacing a plurality of virtual circuits, the packet-based traffic including at least one packet;
   allocating data entry values for scheduling transmission of the at least one packet on one or more of the plurality of virtual circuits, each data entry value further comprising: a timestamp field, an index field representing a newly created data entry, a port field representing a physical port number, and a priority field; and
   sorting the data entry values by the timestamp field to determine a next desired available entry, the determination being made when a particular port is ready to transmit.

2. The method according to claim 1 wherein the index field is used to locate a particular virtual circuit.

3. The method according to claim 1 wherein the timestamp field indicates the earliest absolute time at which an entry may be returned.

4. The method of claim 1 further comprising:
   creating a new value for the timestamp field of the next desired available entry; and
   re-inserting the next desired available entry into the quality of service engine.

5. The method according to claim 1 wherein the priority field is a Boolean high or low value and indicates the priority of an entry.

6. The method according to claim 1 wherein the quality of service engine provides a mask that prevents a port that has an entry which is not ready to be processed from being displayed when it the port is being handled by the quality of service engine.

7. The method of claim 1, wherein the quality of service engine is accessed by a network processor to determine whether to write to or read out of the memory.

8. The method of claim 7, wherein the network processor performs remove reads.

9. The method of claim 8, wherein each remove read is priority checked prior to removing.

10. The method of claim 8, wherein each remove read is a conditional or unconditional remove.

11. The method of claim 1 further comprising:
    locating an identified virtual circuit from the plurality of virtual circuits, the identified virtual circuit being identified by the next desired available entry; and
    transmitting the at least one packet from the identified virtual circuit.

12. An apparatus for accelerating processing of packet-based traffic in a packet switching network, comprising:
    a quality of service engine for accelerating processing of packet-based traffic by pacing a plurality of virtual circuits, the packet-based traffic including at least one packet;
    a plurality of data entry values for scheduling transmission of the at least one packet on one or more of the plurality of virtual circuits, each data entry value further comprising: a timestamp field, an index field representing a newly created data entry, a port field representing a physical port number, and a priority field; and
    a data entry values sorter that sorts at least a portion of the data entry values by the timestamp field for determining a next desired available entry, the determination being made when a particular port is ready to transmit.

13. The apparatus according to claim 12 wherein the timestamp field indicates the earliest absolute time at which an entry may be returned.

14. The apparatus according to claim 12 wherein the index field is used to locate a particular virtual circuit.

15. The apparatus according to claim 12 wherein the priority field is a Boolean high or low value and indicates the priority of an entry.

16. The apparatus according to claim 12 wherein the quality of service engine provides a mask that prevents a port that has an entry which is not ready to be processed from being displayed when the port is being handled by the quality of service engine.

17. The apparatus of claim 12, wherein the quality of service engine is accessed by a network processor to determine whether to write to or read out of the memory.

18. The apparatus of claim 12 further comprising:
a data entry locator that locates an identified virtual circuit from the plurality of virtual circuits, the identified virtual circuit being identified by the next desired available entry;
a data entry transmitter that transmits the at least one packet from the identified virtual circuit;
a data entry creator that creates a new value for the timestamp field of the next desired available entry; and
a data entry inserter that re-inserts the next desired available entry into the quality of service engine.

19. A computer-readable medium containing a computer-executable program for accelerating processing of packet-based traffic in a packet switching network, the program when executed by a computer, performs at least the following:
providing a quality of service engine for accelerating processing of packet-based traffic by pacing a plurality of virtual circuits, the packet-based traffic including at least one packet;
allocating data entry values for scheduling transmission of the at least one packet on one or more of the plurality of virtual circuits, the data entry values further comprising: a timestamp field, an index field representing a newly created data entry, a port field representing a physical port number, and a priority field; and
sorting data entry values by the timestamp field to determine a next desired available data entry, the determination being made when a particular port is ready to transmit.

20. The computer-readable medium of claim 19, further comprising providing a mask that prevents a port that has an entry which is not ready to be processed from showing up when it is being handled by the quality of service engine.

21. The computer-readable medium of claim 19, further comprising accessing the quality of service engine by a network processor to determine at least one of the following: writing to a memory and reading from the memory.

22. The computer-readable medium of claim 19, further comprising the network processor priority checking a plurality of remove reads before removing at least one of the following: a conditional remove and an unconditional remove.

23. The computer-readable medium of claim 19, wherein allocating data entry values for scheduling transmission of packets on one or more virtual circuits further comprises identifying the timestamp field, the index field, the port field and the priority field.

24. The computer readable medium of claim 19 further comprising:
locating an identified virtual circuit from the plurality of virtual circuits, the identified virtual circuit being identified by the next desired available entry;
transmitting the at least one packet from the identified virtual circuit;
creating a new value for the timestamp field of the next desired available entry; and
re-inserting the next desired available entry into the quality of service engine.

25. A method of accelerating processing of packet-based traffic in a packet switching network, comprising:
providing a quality of service engine for accelerating processing of packet-based traffic by pacing a plurality of virtual circuits, the packet-based traffic including at least one packet;
allocating data entry values for scheduling transmission of the at least one packet on the plurality of virtual circuits, each data entry value further comprising: a timestamp field, an index field, a port field, and a priority field;
sorting the data entry values to determine a next desired available entry, the determination being made when a particular port is ready to transmit;
locating a virtual circuit identified by the next desired available entry from the plurality of virtual circuits;
transmitting the at least one packet from the identified virtual circuit;
creating a new value for the timestamp field of the next desired available entry; and
re-inserting the next desired available entry into the quality of service engine.

26. The method of claim 25 further comprising providing a mask to prevent a port having an entry which is not ready to be processed from being displayed when the port is being handled.

* * * * *

UNITED STATES PATENT AND TRADEMARK OFFICE
CERTIFICATE OF CORRECTION

| | | |
|---|---|---|
| PATENT NO. | : 7,643,413 B2 | Page 1 of 1 |
| APPLICATION NO. | : 10/746235 | |
| DATED | : January 5, 2010 | |
| INVENTOR(S) | : Milway et al. | |

It is certified that error appears in the above-identified patent and that said Letters Patent is hereby corrected as shown below:

Column 16, Line 34, claim 6: delete "it" after the word "when"

Signed and Sealed this
Fourth Day of October, 2011

David J. Kappos
*Director of the United States Patent and Trademark Office*